US010261337B2

(12) United States Patent
Yeon et al.

(10) Patent No.: US 10,261,337 B2
(45) Date of Patent: Apr. 16, 2019

(54) APPARATUS FOR DRIVING OPTICAL-REFLECTOR

(71) Applicant: JAHWA electronics Co., Ltd., Chungcheongbuk-do (KR)

(72) Inventors: Je Seung Yeon, Chungcheongbuk-do (KR); Byung Cheol Lee, Gyeongsangnam-do (KR); Byung Kill Kang, Chungcheongbuk-do (KR); Chul Soon Park, Chungcheongnam-do (KR)

(73) Assignee: JAHWA ELECTRONICS CO., LTD., Chungcheongbuk-Do (KR)

( * ) Notice: Subject to any disclaimer, the term of this patent is extended or adjusted under 35 U.S.C. 154(b) by 63 days.

(21) Appl. No.: 15/476,179

(22) Filed: Mar. 31, 2017

(65) Prior Publication Data

US 2018/0095293 A1 Apr. 5, 2018

(30) Foreign Application Priority Data

Oct. 5, 2016 (KR) ........................ 10-2016-0128111
Feb. 23, 2017 (KR) ........................ 10-2017-0024368

(51) Int. Cl.
*G02B 27/64* (2006.01)
*H02K 11/215* (2016.01)
*H02K 33/16* (2006.01)
*H02P 6/00* (2016.01)

(52) U.S. Cl.
CPC ......... *G02B 27/646* (2013.01); *H02K 11/215* (2016.01); *H02K 33/16* (2013.01); *H02P 6/006* (2013.01)

(58) Field of Classification Search
CPC .............................. G02B 27/646; H02P 6/006
USPC .................................. 359/555; 348/345, 357
See application file for complete search history.

(56) References Cited

U.S. PATENT DOCUMENTS 5,041,852 A * 8/1991 Misawa ............. H04N 5/23248 348/E5.046
2008/0253003 A1* 10/2008 Shin ....................... G02B 7/102 359/824
2015/0195458 A1* 7/2015 Nakayama ............... G03B 5/00 348/208.11

FOREIGN PATENT DOCUMENTS

KR 10-2014-0014787 A 2/2014
KR 10-2015-0044360 A 4/2015

OTHER PUBLICATIONS

Office action (Opinion Submission Notification) dated Feb. 13, 2018 from KIPO in a counterpart Korean Patent Application No. 10-2017-0024368.

* cited by examiner

*Primary Examiner* — Kristina M Deherrera
(74) *Attorney, Agent, or Firm* — The PL Law Group, PLLC

(57) ABSTRACT

An apparatus for driving an optical-reflector includes a support frame having a groove line formed therein, an optical-reflector installed at the support frame to change a path of light input through an opening so that the light is put into a lens, a base frame having a guiding groove formed with a shape corresponding to the groove line, and a plurality of balls disposed between the groove line and the guiding groove so that the support frame and the base frame are kept in a spaced state, and a driving unit configured to move the support frame along a path corresponding to the groove line or the guiding groove.

4 Claims, 8 Drawing Sheets

Z
Y
X
100
15
170
131
180
140
150
190
160
110
120
130
145
105
Z1
LIGHT
Z

APPARATUS FOR DRIVING OPTICAL-REFLECTOR

CROSS-REFERENCE TO RELATED APPLICATION AND CLAIM OF PRIORITY

The present application claims priority to Korean Patent Application KR 10-2016-0128111 filed on Oct. 5, 2016 in the Korea Intellectual Property Office and Korean Patent Application KR 10-2017-0024368 filed on Feb. 23, 2017 in the Korea Intellectual Property Office, the disclosures of which are incorporated herein by reference.

BACKGROUND

Technical Field

The present disclosure relates to an apparatus for driving an optical-reflector, and more particularly, to an apparatus for driving an optical-reflector for optical image stabilization (OIS), which improves precision of optical image stabilization by applying a structure for rotating an optical-reflector using a guide with a rounded shape or the like.

Background Art

Along with the development of hardware techniques and the change of user environments or the like, various and complicated functions are integrally implemented at a mobile terminal such as a smart phone, in addition to a basic function for communication.

A representative example is a camera module having an auto focus (AF) function and an optical image stabilization (OIS) function. Also, a voice recognition function, a fingerprint recognition function, an iris recognition function or the like are loaded on a portable terminal for authentication or security, and it is attempted to mount a zoom lens in which a plurality of lenses are grouped to adjust a focus distance variously.

A zoom lens is configured to have a plurality of lenses or lens groups, arranged in an optical axis direction in which light is input, different from a general lens, and thus the zoom lens has a longer length in its optical axis direction in comparison to general lenses.

Light passing through the zoom lens is put into a photographing device such as a charge-coupled device (CCD) and a complementary metal-oxide semiconductor (CMOS), and image data is generated therefrom by means of following processing.

For this reason, when a zoom lens is installed at a portable terminal, the zoom lens should be installed to stand on a main board, namely in a direction perpendicular to the main board, and thus the portable terminal should ensure a space as much as a height of the zoom lens (or, a length in the optical axis direction).

Therefore, a conventional zoom lens mounted at a portable terminal may not be easily optimized for a small and light design, which is an intrinsic characteristic aimed by the portable terminal.

To solve this problem, there has been proposed a method for reducing a size of an optical system by adjusting an angle and size of lenses, an interval thereof, a focus distance or the like, but this method intrinsically has a limit since it is directed to physically reduce the size of a zoom lens or a zoom lens barrel, and also the intrinsic features of the zoom lens may be deteriorated.

Meanwhile, an optical image stabilization (OIS) method generally applied in the art correctively move a lens or a lens module in two directions (X-axis and Y-axis directions) on a plane perpendicular to an optical axis direction (Z axis). If this method is applied to a zoom lens as it is, there are problems such as low space utilization caused by the shape, structure, functions or the like of the zoom lens, an increased volume of the device, and difficulty in ensuring precision.

To solve the above problems, there has been attempted a method of mounting an optical-reflector for reflecting light to an actuator and moving the optical-reflector based on two axes parallel to a plane of the optical-reflector. However, for this method, a complicated electromagnetic force driving unit should be applied directly to the optical-reflector, and thus the structure of the optical-reflector and its peripheries is seriously complicated, and also its weight increases.

Further, there has also been attempted a method for axially coupling an optical-reflector to a fixed structure and rotating the optical-reflector in a certain direction to correct shaking of a photographed image based on a lens or a photographing device (CCD, CMOS or the like). However, in this method, a load of the optical-reflector or a support to which the optical-reflector is coupled is applied in a specific direction, and thus the intensity of a driving power is not functionally proportional to the movement of the optical-reflector, but the optical-reflector is intermittently driven, which does not ensure precise control.

SUMMARY

The present disclosure is designed to solve the problems of the related art, and therefore the present disclosure is directed to providing an apparatus for driving an optical-reflector for OIS, which may enhance precision in driving by applying a guide structure with a rounded shape where rotation of an optical-reflector for changing a path of light is physically supported and guided, and also minimize a driving force required for rotating the optical-reflector.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an apparatus for driving an optical-reflector, comprising: a support frame having a groove line formed therein; an optical-reflector installed at the support frame to change a path of light input through an opening so that the light is put into a lens; a base frame having a guiding groove formed with a shape corresponding to the groove line; and a plurality of balls disposed between the groove line and the guiding groove so that the support frame and the base frame are kept in a spaced state; and a driving unit configured to move the support frame along a path corresponding to the groove line or the guiding groove.

Here, the groove line may have a rounded shape, the support frame may rotate along a path corresponding to the groove line or the guiding groove, and the groove line and the guiding groove may have curvatures corresponding to each other.

In addition, the driving unit may include an OIS magnet disposed at any one of the support frame and the base frame; and a coil disposed at the other one of the support frame and the base frame where the OIS magnet is not disposed, to generate an electromagnetic force to the OIS magnet.

Further, the OIS magnet may be provided at a side of the support frame at which the optical-reflector is not provided, and the groove line may be respectively formed at both sides of the OIS magnet.

Moreover, the apparatus may further comprise a sensing magnet provided at a location spaced apart from the OIS magnet in a direction from the OIS magnet toward the zoom lens; and a hall sensor provided at a location corresponding to the sensing magnet.

In another aspect of the present disclosure, there is also provided an apparatus for driving an optical-reflector for OIS, comprising: an optical-reflector having a groove line formed therein to allow light input through an opening to be put into a lens; a base frame having a guiding groove formed with a shape corresponding to the groove line; a plurality of balls disposed between the groove line and the guiding groove so that the optical-reflector and the base frame are kept in a spaced state; and a driving unit configured to move the optical-reflector along a path corresponding to the groove line or the guiding groove.

According to an embodiment of the present disclosure, since optical image stabilization in one axial direction may be performed by an optical-reflector which changes a path of light and optical image stabilization in another axial direction may be performed by a lens, the driving apparatus may be implemented with a simple structure in comparison to an existing technique where optical image stabilization in all axial directions are performed by a lens, and also space utilization of the driving apparatus may be further enhanced, which may minimize the size of the driving apparatus.

According to an embodiment of the present disclosure, since the rotation of the optical-reflector for changing a path of light is physically supported and guided by the guiding structure with a curvature and the point-contact of the balls, which may improve the precision of optical image stabilization and also minimize a power required for the optical image stabilization.

In addition, since a coupling structure of components or elements may be simplified in the present disclosure, the assembling process may be performed more rapidly and accurately, thereby lowering a defective fraction and further enhancing the production efficiency.

DETAILED DESCRIPTION

Figure 1:
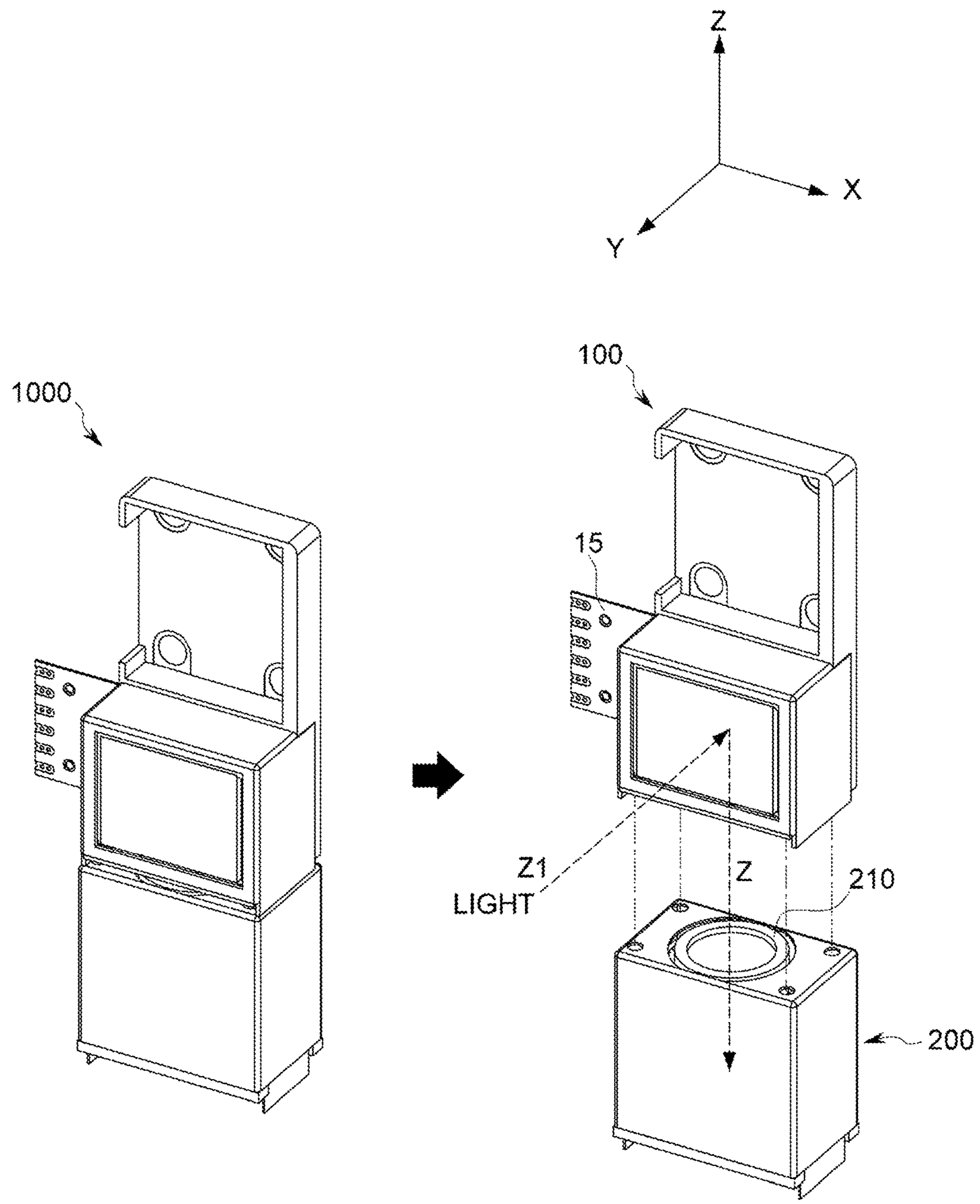
FIG. 1 is a diagram showing an overall configuration of a driving apparatus according to an embodiment of the present disclosure and an actuator to which the driving apparatus is applied.

FIG. 1 is a diagram showing an overall configuration of an apparatus 100 for driving an optical-reflector (hereinafter, also referred to as a "driving apparatus") according to an embodiment of the present disclosure and an actuator 1000 to which the driving apparatus is applied.

The driving apparatus 100 of the present disclosure may be implemented as a single device, or may also be implemented as a component of a single actuator 1000 so as to be coupled to an upper portion or like of a lens driving unit 200, which includes a lens (a zoom lens) 210, and a unit for performing auto focusing (AF) operation to the lens 210, a unit for performing optical image stabilization (OIS) in one axial direction, or a unit for performing AF operation and OIS operation together in one axis direction, as shown in FIG. 1.

In the present disclosure, light of a subject or the like is not directly input to the lens 210, but the light is input to the lens 210 after its path is changed (refracted, reflected or the like) by means of an optical-reflector 120 (see FIG. 2) provided at the driving apparatus 100 of the present disclosure. In FIG. 1, a path of light input from the external area is Z1, and a path of light formed by refracting or reflecting the path Z1 by means of the optical-reflector 120 and input to the lens 210 is Z. Hereinafter, Z will be called an optical axis or an optical axis direction.

A connector 15 depicted in FIG. 1 is used for supplying power to a coil, controlling operations, communicating date or the like, as explained later, and the connector 15 may be exposed outwards for effective interfacing with an external device as shown in FIG. 1.

In addition, though not shown in the figure, a photographing device such as CCD and CMOS for converting light signals into electric signals may be provided below the lens 210 on the basis of the optical axis direction, and a filter for passing or blocking light signals of specific frequency bands may also be provided together.

Hereinafter, the configuration of the optical-reflector 120 according to the present disclosure and a configuration for changing a path of light by using the optical-reflector 120 and performing OIS in a first direction (a Y-axis direction) will be described in detail with reference to the drawings.

As explained later, in the present disclosure, the existing OIS method in which a lens is moved in two directions perpendicular to the optical axis Z, namely in an X-axis direction (a second direction) and a Y-axis direction (a first direction) is not used, but a technique for implementing OIS in a single axial direction by using the optical-reflector 120, which changes a path of light, is used.

Figure 2:
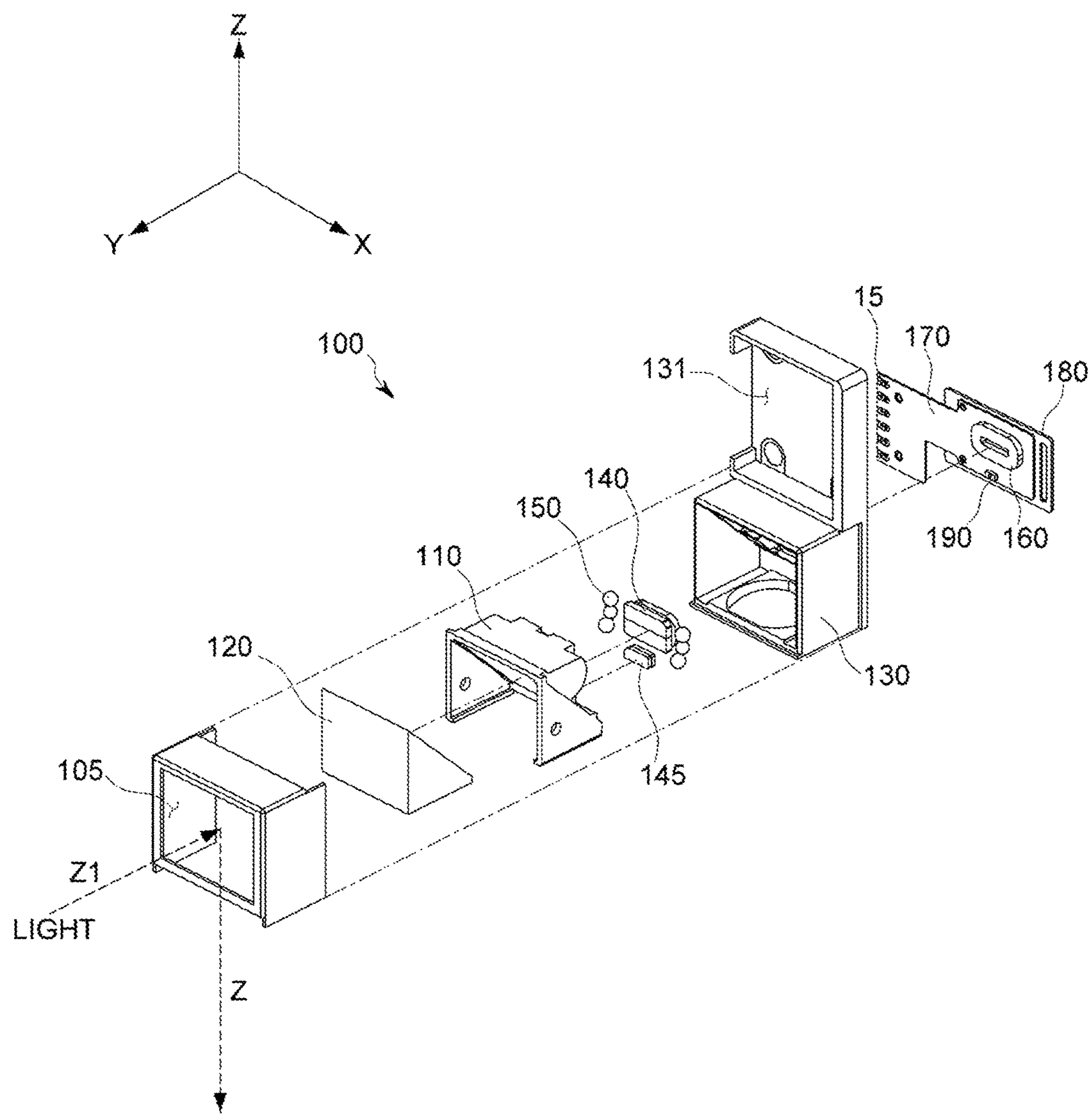
FIG. 2 is an exploded view showing a detailed configuration of the driving apparatus according to an embodiment of the present disclosure.

FIG. 2 is an exploded view showing a detailed configuration of the driving apparatus 100 according to an embodiment of the present disclosure.

As shown in FIG. 2, the driving apparatus 100 of the present disclosure may include a case 103 with an opening 105, a support frame 110, an optical-reflector 120, a base frame 130, a ball 150 and driving units 140, 160.

The lens 210 may be a single lens or a zoom lens including a plurality of lenses or lens groups or an optical member such as a prism, mirror or the like therein. If the lens 210 is a zoom lens or a zoom lens barrel, the lens 210 may be elongated in a vertical longitudinal direction (a Z-axis direction).

The driving unit of the present disclosure gives a driving force for moving or rotating the optical-reflector 120 or the support frame 110 to which the optical-reflector 120 is coupled. Depending on embodiments, the driving unit may employ a piezoelectric device, a motor or any other unit capable of moving the subject in the optical axis direction.

In this regard, considering power consumption, low noise, space utilization, response speed or the like, the driving unit of the present disclosure may be implemented using a coil 160 and an OIS magnet 140, which generate an electromagnetic force.

In addition, the driving force generated between the coil and the magnet forms a relative relationship between them, and thus it is also possible that the coil is disposed at the moving subject and the magnet is mounted to a fixed body corresponding thereto. However, if the coil is disposed at the moving subject, a structure for applying electric power may be somewhat complicated, and thus it is desirable that the magnet is mounted to the moving subject and the coil is mounted to a fixed body.

The following description will be based on a case where the driving unit is implemented using the OIS magnet 140 and the coil 160, so that the OIS magnet 140 is provided at the optical-reflector 120 serving as a moving subject or the support frame 110 to which the optical-reflector 120 is coupled, and the coil 160 is provided at the base frame 130 or a fixed body.

As described above, a vertical axial direction of the lens 210, namely an axial direction corresponding to a path of light input to the lens 210, is defined as an optical axis (Z axis), and two axes on a plane perpendicular to the optical axis (Z axis) are defined as X axis and Y axis.

As shown in FIG. 2, if light in the path Z1 is input to the driving apparatus 100 of the present disclosure through the opening 105 of the case 103, the optical-reflector 120 of the present disclosure changes (refracts, reflects or the like) the path of the input light toward the optical axis direction (Z) so that the light is input to the lens 210.

The optical-reflector 120 may be any one selected from a mirror and a prism, or a combination thereof, and may be implemented using various members capable of changing a path of light introduced form the external area to the optical axis direction.

Since light is input to the lens 210 after its path is refracted by the optical-reflector 120 as described above, in the present disclosure, the lens 210 may not be installed in a thickness direction of a portable terminal. For this reason, even though a zoom lens is mounted to a portable terminal, the thickness of the portable terminal does not increase, which is optimal for a small design of the portable terminal.

The optical-reflector 120 of the present disclosure as described above is installed at the support frame 110, and the support frame 110 is installed to be rotatable with respect to the base frame 130. As shown in FIG. 2, the optical-reflector 120 is installed at a side of the support frame 110 toward the opening 105 at which light is input, namely to be oriented to the front in a Y-axis direction.

The OIS magnet 140 for performing optical image stabilization in the Y-axis direction is provided at a side of the support frame 110 of the present disclosure where the optical-reflector 120 is not installed. FIG. 2 depicts an embodiment in which the OIS magnet 140 is provided at a side opposite to the optical-reflector 120, as an example. Depending on embodiments, the OIS magnet 140 may also be provided at other sides or in other directions, different from that of FIG. 2, where the optical-reflector 120 is not provided.

The sensing magnet 145 for sensing a location may be provided below the optical axis (Z axis) based on the OIS magnet 140. The sensing magnet 145 will be described in detail later.

Based on the example depicted in FIG. 2, the base frame 130 for supporting rotation of the support frame 110 is provided at the rear of the support frame 110 in the Y-axis direction.

The balls 150 are disposed between the support frame 110 and the base frame 130, and the balls 150 allows the support frame 110 and the base frame 130 to be spaced by a predetermined interval (corresponding to the diameter of the balls) and make point contact so that the support frame 110 may smoothly move with a minimum friction caused by the point contact.

As shown in FIG. 2, a lens mounting space 131 may be further formed at the base frame 130, and at the lens mounting space 131, an additional lens or the like having an optical characteristic different from the lens 210 of the lens driving unit 200 explained above with reference to FIG. 1 may be mounted. In some embodiments, as shown in a lower portion of FIG. 4, the lens mounting space 131 may be not provided.

Based on FIG. 2, a flexible printed circuit board (FPCB) 170 is provided at the rear of the base frame 130 in a Y-axis direction, and a coil 160 located at a location corresponding to the OIS magnet 140 to face the OIS magnet 140 is provided to the FPCB 170 to generate an electromagnetic force to the OIS magnet 140. In addition, a hall sensor 190 for detecting a location of a magnet (or, a moving subject having the magnet) by means of a hall effect is provided at the FPCB 170. One end of the FPCB 170 is the connector 15 illustrated in FIG. 1.

A yoke 180 may be provided at the rear of the FPCB 170 to generate an attractive force to the OIS magnet 140. The yoke 180 generates an attractive force to the OIS magnet 140 provided at the support frame 110 so that the support frame 110 and the base frame 130 may continuously maintain a point-contacting state without deviating from the ball 150.

Figure 3:
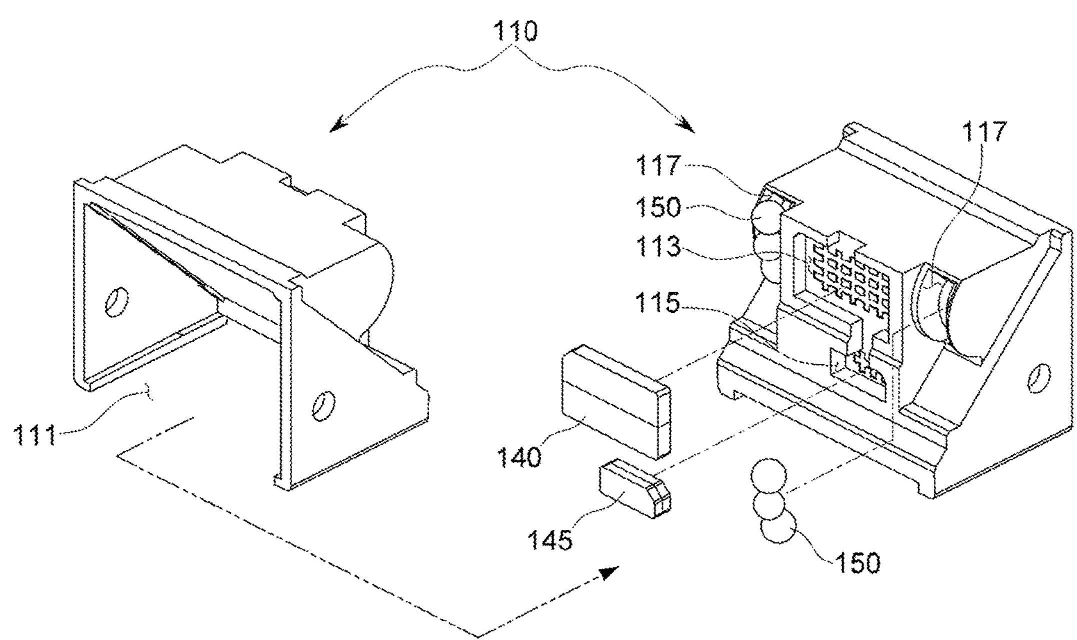
FIG. 3 is a detailed view showing a support frame and relevant components according to an embodiment of the present disclosure.

FIG. 3 is a detailed view showing the support frame 110 and relevant components according to an embodiment of the present disclosure.

As shown in FIG. 3, the support frame 110 of the present disclosure has a mounting space 111 in a front direction (or, in a Y-axis direction), and the optical-reflector 120 is mounted in the mounting space 111. A first groove 113 at which the OIS magnet 140 is installed and a second groove 115 at which the sensing magnet 145 is installed below the first groove 113 in a vertical direction based on FIG. 3 are provided at the rear of the mounting space 111.

The first groove 113 may be located at a center portion of the support frame 110 so that a driving force caused by the electromagnetic force generated between the coil 160 and the OIS magnet 140 may be accurately applied.

As shown in FIG. 3, the support frame 110 of the present disclosure is provided at a groove line 117 having a rounded shape with a predetermined curvature. As described later, the support frame 110 rotates along the groove line 117 with a rounded shape.

In addition, as shown in the figure, the plurality of balls 150 which make rolling movements make point-contact with the groove line 117 to be partially received in the groove line 117.

In order to effectively support physical movement of the support frame 110 and also minimize tilting, shaking or separation of the support frame 110, the groove line 117 may have a rounded shape extending in a longitudinal direction based on the optical axis direction and may be symmetrically formed at an edge of the support frame 110.

In other words, based on the embodiment of the present disclosure depicted in the figures, the OIS magnet 140 may be provided at a center portion of the support frame 110, and the groove line 117 may be respectively formed at both sides of the OIS magnet 140.

The hall sensor 190 depicted in FIG. 2 functions to detect a location of a magnet by means of a hall effect as described above, and by doing so, a location of a moving subject having the magnet is detected. In the present disclosure, the moving subject corresponds to the optical-reflector 120.

The support frame 110 (to which the optical-reflector 120 is mounted) of the present disclosure rotates as described above, and an end portion of the rotating subject has a relatively greater change in height in comparison to a center portion thereof.

By using this physical phenomenon, as shown in FIG. 3, the second groove 115 may be provided to the support frame 110 at a location spaced from the first groove 113 in a lower direction so that the sensing magnet 145 is provided to be spaced apart from the OIS magnet 140 in a lower direction in order to allow more accurate detection of a location of the magnet.

The hall sensor 190 described above with reference to FIG. 2 may also be provided to be spaced apart in a lower direction based on the optical axis (Z axis) from the coil 160 provided at a location corresponding to the OIS magnet 140, so that the hall sensor 190 may be provided at a location corresponding to the sensing magnet 145.

If the hall sensor 190 detects a location of the OIS magnet 140 (or, a location of the optical-reflector 120) by means of the hall effect and transmits a detection signal to a driver (not shown), the driver controls a power with a suitable intensity and direction to the coil 160 by using the signal input from the hall sensor 190.

By controlling an accurate location of the optical-reflector 120 by means of this feeding-back control, the optical image stabilization in the first direction (Y-axis direction) may be accurately implemented. Though the driver (not shown) may be implemented independently from the hall sensor 190, the driver may also be implemented in a single chip or module together with the hall sensor.

Even though the hall sensor 190 is configured to detect a current location of the optical-reflector 120 by detecting a location of the OIS magnet 140, it is also possible that the magnet for OIS is separated into the OIS magnet 140 and the sensing magnet 145 so that the hall sensor 190 may detect a location of the optical-reflector 120 more accurately and more effectively.

Figure 4:
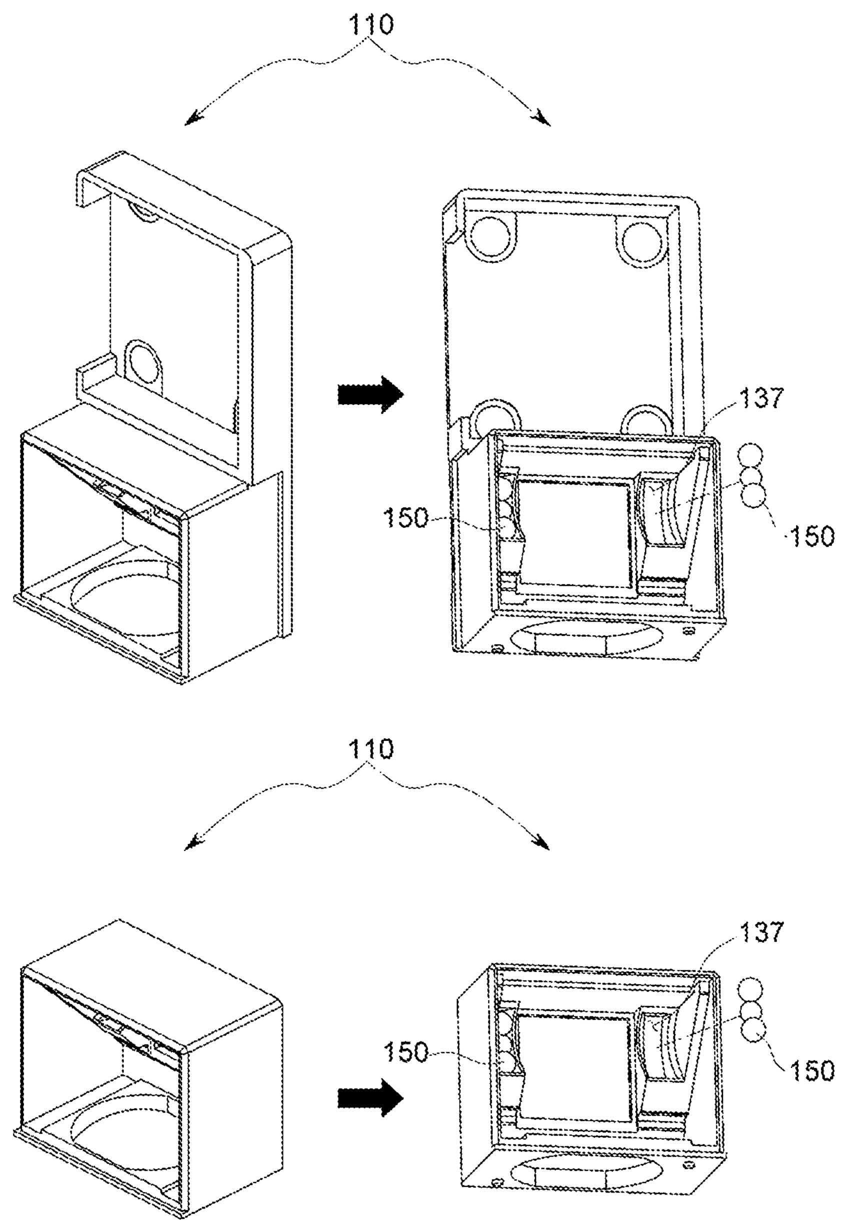
FIG. 4 is a detailed view showing a base frame and relevant components according to an embodiment of the present disclosure.

FIG. 4 is a detailed view showing the base frame 130 and relevant components according to an embodiment of the present disclosure.

As shown in FIG. 4, the base frame 130 of the present disclosure has a guiding groove 137 with a shape corresponding to the groove line 117 described above. Since the groove line 117 may be respectively provided at edges of the support frame 110 as described above, the guiding groove 137 may also be provided at edges of the base frame 130 in the same number as the groove lines 117.

As shown in FIG. 4, the ball 150 is provided to the guiding groove 137 to be partially received in the guiding groove 137. In other words, the ball 150 is disposed between the support frame 110 and the base frame 130, in more detail between the groove line 117 of the support frame 110 and the guiding groove 137 of the base frame 130.

In other words, the ball 150 makes point-contact with the groove line 117 in one direction and makes point-contact with the guiding groove 137 in another direction, so that the support frame 110 and the base frame 130 keep a spaced state. Also, the point contact by the ball 150 is continuously maintained by means of the attractive force between the yoke 180 made of metal material and the OIS magnet 140 provided at the support frame 110.

The groove line 117 and the guiding groove 137 may have curvatures corresponding to each other so that the support frame 110, namely the support frame 110 having the optical-reflector 120, may flexibly rotate.

The groove line 117 and the guiding groove 137 may be implemented with various shapes as long as they are capable of guiding rotation of the support frame 110 provided at the optical-reflector 120. However, the groove line 117 and the guiding groove 137 may have arc shapes with curvatures corresponding to each other so that the support frame 110 may rotate while functionally corresponding to the intensity and direction of power applied to the coil 160. As shown in a lower portion of FIG. 4, a space where an additional lens is mounted and a housing may be not provided depending on embodiments.

Figure 5A:
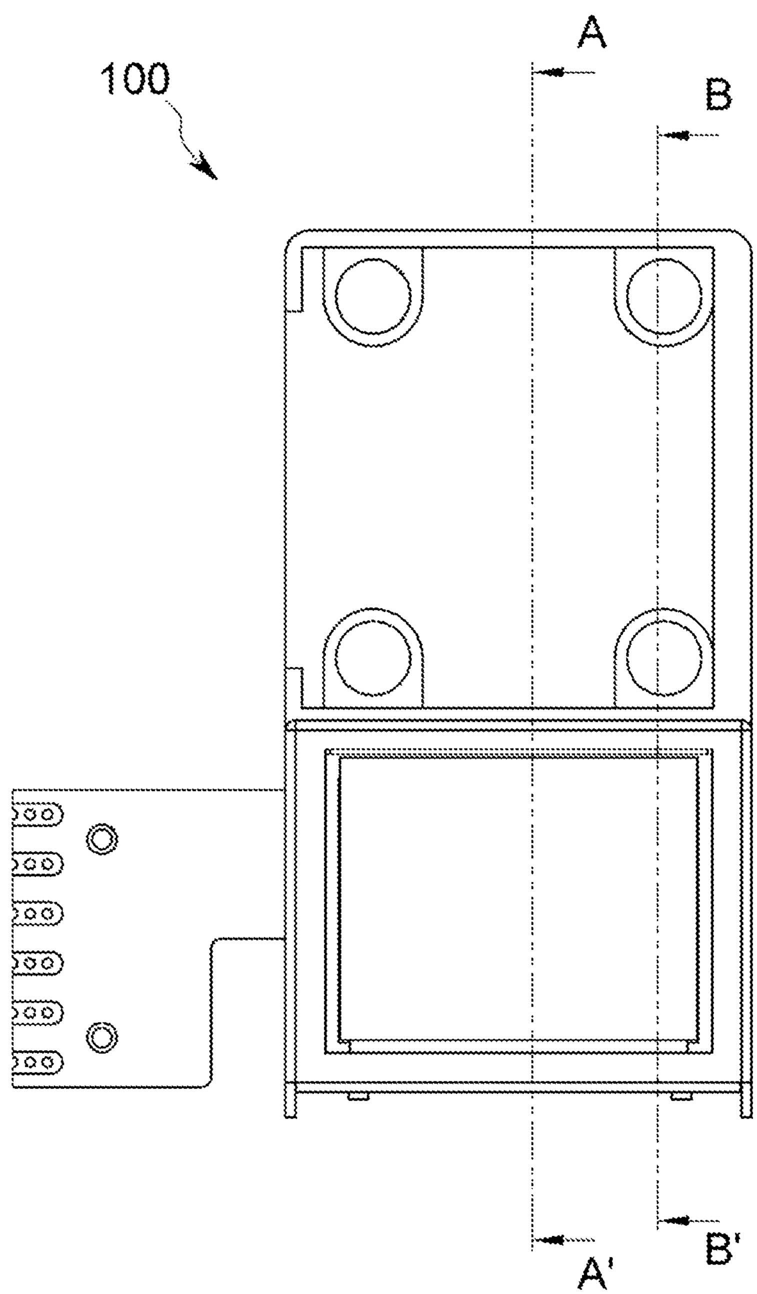
FIGS. 5A to 5C show an electromagnetic force structure and a physical movement structure of the present disclosure.
Figure 5B:
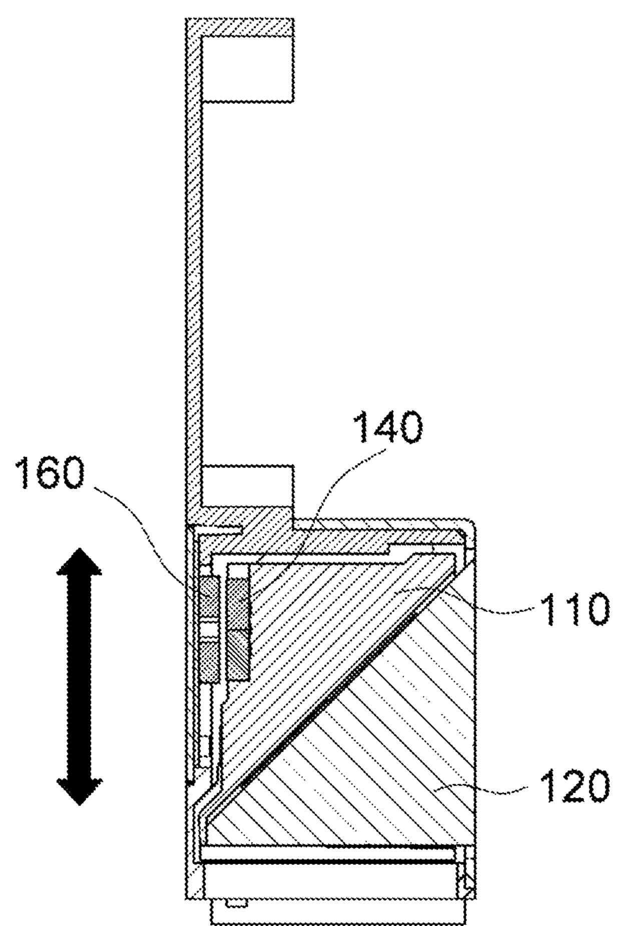
Figure 5C:
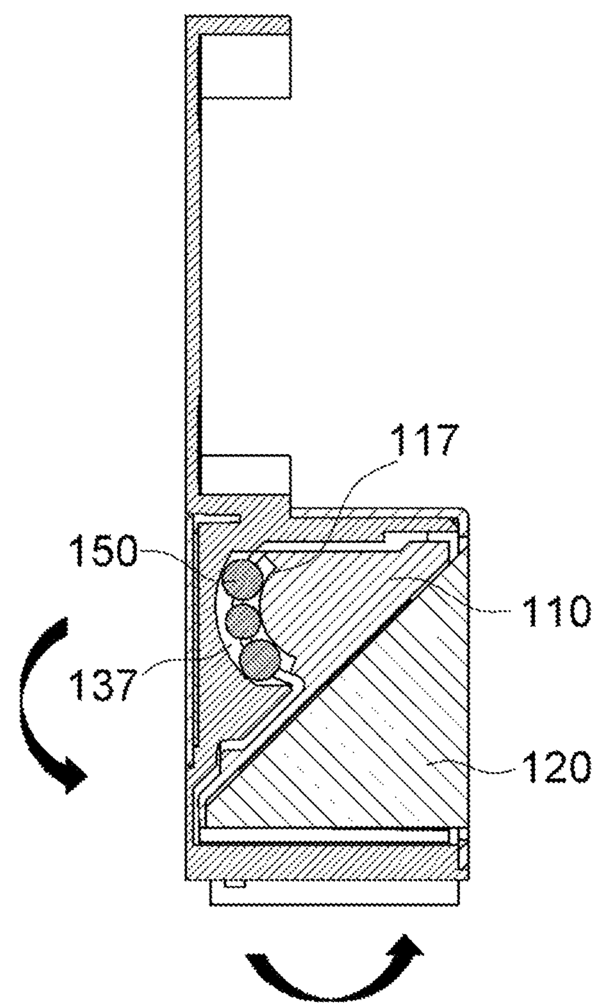

FIGS. 5A to 5C are views showing an electromagnetic force structure and a physical movement structure of the present disclosure.

FIG. 5B is a cross-sectioned view, taken along the line A-A' of FIG. 5A, and FIG. 5C is a cross-sectioned view, taken along the line B-B' of FIG. 5A.

As shown in FIG. 5B, if a power of suitable intensity and direction is applied to the coil 160, an electromagnetic force is generated between the coil 160 and the OIS magnet 140 provided at the support frame 110. The electromagnetic force is applied in a plane direction along which the coil 160 and the OIS magnet 140 face each other, namely in the Z-axis direction, as shown in FIG. 5B.

As shown in FIG. 5C, since the support frame 110 is physically supported and guided by the groove line 117 thereof with a rounded shape as well as the guiding groove 137 and the ball 150 of the base frame 130, the support frame 110 rotates along a path corresponding to the shape of the guiding groove 137 and the groove line 117 by means of the electromagnetic force generated by the coil 160.

Since the optical-reflector 120 is installed at the support frame 110, if the support frame 110 rotates by means of the electromagnetic force of the coil 160 as described above, the optical-reflector 120 also rotates according to the physical movement of the support frame 110. If the optical-reflector 120 rotates, a path Z1 of light input from the external area is changed into a path Z of light input to the lens 210.

If the path Z of light input to the lens 210 is corrected or modified, optical image stabilization is performed to the lens 210 in the Y-axis direction. Hereinafter, the process of performing optical image stabilization in a specific axial direction (Y-axis direction) will be described in detail with reference to FIG. 6.

Figure 6:
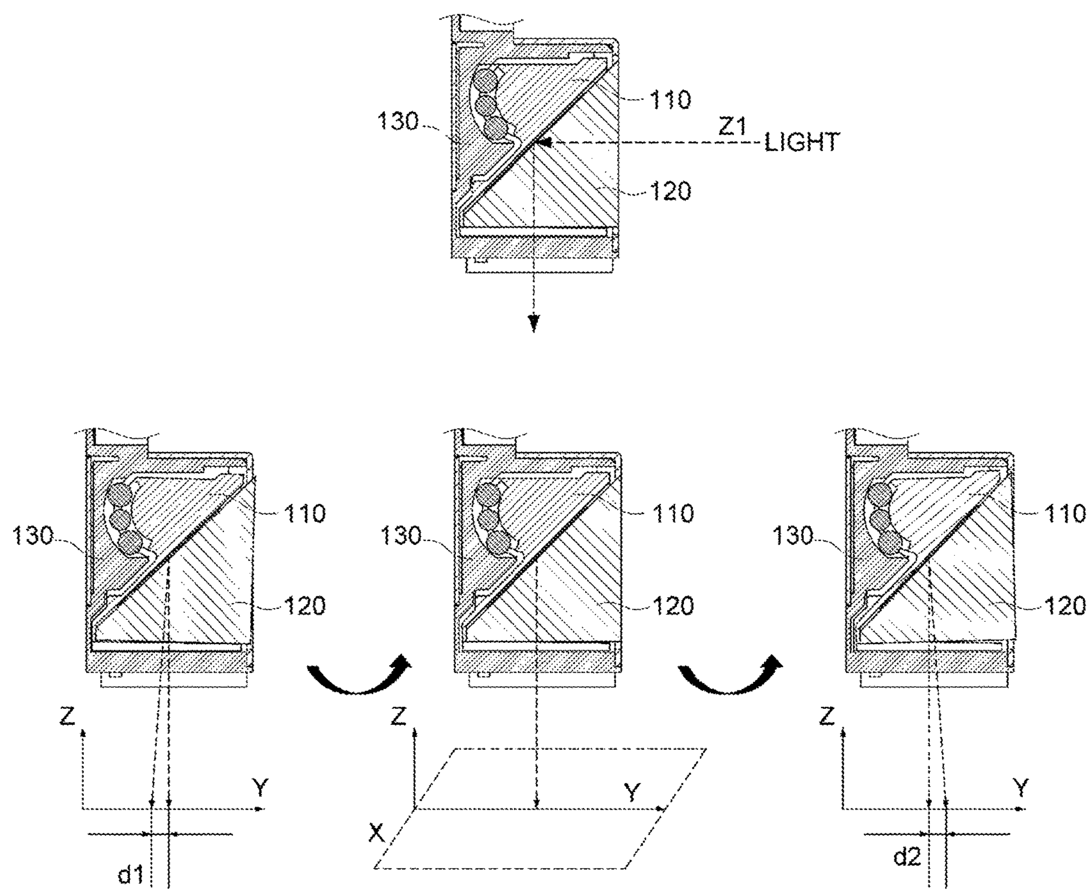
FIG. 6 is a diagram for illustrating Y-axial OIS of the present disclosure, implemented by rotating an optical-reflector.

FIG. 6 is a diagram for illustrating Y-axial OIS of the present disclosure, implemented by rotating the optical-reflector 120.

A central portion of FIG. 6 is a diagram showing the optical-reflector 120 in a reference condition to which optical image stabilization is not performed.

As shown in the central portion of FIG. 6, a light of an external area is input along the path Z1, and its path is changed by means of the optical-reflector 120, and then the light is input to the lens 210 in the optical axis direction (Z).

If external shaking caused by hand shaking or the like is transferred to the driving apparatus 100 of the present disclosure so that the optical-reflector 120 is shaken in the Y-axis direction, the driver (not shown) of the present disclosure controls a power of intensity and direction suitable for correcting a location to be applied to the coil 160, by performing feeding-back control by means of the optical-reflector 120, namely the OIS magnet 140 physically integrated with the optical-reflector 120, or the hall sensor 190 for sensing a location of the sensing magnet 145.

If an electromagnetic force is generated between the coil 160 and the OIS magnet 140 by means of the feeding-back control, the optical-reflector 120 rotates with direction and intensity to compensate for hand shaking by using the generated electromagnetic force as a driving force, thereby stabilizing the movement caused by hand shaking.

If the electromagnetic force generated from the coil 160 rotates the optical-reflector 120 in a clockwise direction as shown in a left portion of FIG. 6, the input light generates variation (d1) in a left direction, and thus in view of a lens or a photographing device such as CCD, correction is made in the Y-axis direction (in a left direction based on FIG. 6).

In this point of view, if the electromagnetic force generated from the coil 160 rotates the optical-reflector 120 in a counterclockwise direction as shown in a right portion of FIG. 6, the input light generates variation (d2) in a right direction, and thus in view of a lens or a photographing device such as CCD, correction is made in the Y-axis direction (in a right direction based on FIG. 6).

As described above, in the present disclosure, by rotating the optical-reflector 120, optical image stabilization is performed in a specific direction. Further, since the rotation of the optical-reflector 120 is physically supported and guided by the groove line 117 and the ball 150 of the guiding groove 137, which have curvatures, the driving operation may be controlled more precisely and may also be performed with a minimum power.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An apparatus for driving an optical-reflector, comprising:
- a lens;
- a support frame having a groove line formed therein, wherein the groove line has a round shape and is independently disposed in front of the lens with respect to an optical axis;
- an optical-reflector installed at the support frame to change a path of light input through an opening so that the light is put into the lens;
- a base frame having a guiding groove formed with a shape corresponding to the groove line;
- a plurality of balls disposed between the groove line and the guiding groove so that the support frame and the base frame are kept in a spaced state; and
- a driving unit configured to rotate the support frame along a path corresponding to the groove line or the guiding groove, wherein the driving unit includes:
- an OIS magnet provided at a side of the support frame at which the optical-reflector is not provided; wherein the groove line is respectively formed at both sides of the OIS magnet; and
- a coil disposed at the base frame, to generate an electromagnetic force to the OIS magnet.

2. The apparatus for driving an optical-reflector of claim 1, wherein the groove line and the guiding groove have curvatures corresponding to each other.

3. The apparatus for driving an optical-reflector of claim 1, further comprising:
- a yoke configured to generate an attractive force to the OIS magnet.

4. The apparatus for driving an optical-reflector of claim 1, further comprising:
- a sensing magnet provided at a location spaced apart from the OIS magnet in a direction from the OIS magnet toward the zoom lens; and
- a hall sensor provided at a location corresponding to the sensing magnet.

* * * * *